US012633635B2

(12) United States Patent
Wang

(10) Patent No.: US 12,633,635 B2
(45) Date of Patent: May 19, 2026

(54) MIXED-MODE DIELECTRIC WAVEGUIDE FILTER

(71) Applicant: Samsung Electronics Co., Ltd., Suwon-si (KR)

(72) Inventor: Ruoming Wang, Shenzhen (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 18/758,778

(22) Filed: Jun. 28, 2024

(65) Prior Publication Data

US 2024/0356189 A1 Oct. 24, 2024

Related U.S. Application Data

(63) Continuation of application No. PCT/KR2023/003916, filed on Mar. 24, 2023.

(30) Foreign Application Priority Data

Apr. 15, 2022 (CN) ......................... 202210398578.1

(51) Int. Cl.
*H01P 1/20* (2006.01)
*H01P 5/08* (2006.01)
*H01P 7/10* (2006.01)

(52) U.S. Cl.
CPC .............. *H01P 1/2002* (2013.01); *H01P 5/08* (2013.01); *H01P 7/105* (2013.01)

(58) Field of Classification Search
CPC .......... H01P 1/2002; H01P 5/08; H01P 7/105; H01P 1/2086; H01P 1/208; H01P 1/2082
USPC ......................... 333/206, 207, 203, 222, 223
See application file for complete search history.

(56) References Cited

U.S. PATENT DOCUMENTS

| | | | | |
|---|---|---|---|---|
| 7,605,678 | B2 | 10/2009 | Ando et al. | |
| 9,130,255 | B2 * | 9/2015 | Rogozine | H01P 1/2088 |
| 2010/0156568 | A1 * | 6/2010 | Liao | H01P 1/208 333/212 |
| 2015/0180103 | A1 * | 6/2015 | Hendry | H01P 1/2002 333/202 |
| 2016/0028138 | A1 | 1/2016 | Snyder et al. | |

FOREIGN PATENT DOCUMENTS

| | | |
|---|---|---|
| CN | 111384548 A | 7/2020 |
| CN | 112542665 A | 3/2021 |
| CN | 112736383 A | 4/2021 |

(Continued)

OTHER PUBLICATIONS

International Search Report dated Jul. 4, 2023, issued in International Patent Application No. PCT/KR2023/003916.

*Primary Examiner* — Jorge L Salazar, Jr.
(74) *Attorney, Agent, or Firm* — Jefferson IP Law, LLP

(57) ABSTRACT

A mixed-mode dielectric waveguide filter is provided. The mixed-mode dielectric waveguide filter includes a first multi-mode resonant cavity having at least two resonant modes, and a pair of first single-mode resonant cavities, wherein the pair of first single-mode resonant cavities correspond to the first multi-mode resonant cavity, and are directly coupled to a respective resonant mode of the first multi-mode resonant cavity to form a series topology with the first multi-mode resonant cavity, and wherein a parallel topology is formed between resonant modes of the first multi-mode resonant cavity.

10 Claims, 5 Drawing Sheets

(56) References Cited

FOREIGN PATENT DOCUMENTS

| | | | |
|---|---|---|---|
| CN | 112952312 | A | 6/2021 |
| JP | 4131277 | B2 | 8/2008 |
| JP | 2019-041183 | A | 3/2019 |
| KR | 10-2333921 | B1 | 12/2021 |

* cited by examiner

MIXED-MODE DIELECTRIC WAVEGUIDE FILTER

CROSS-REFERENCE TO RELATED APPLICATION(S)

This application is a continuation application, claiming priority under § 365(c), of an International application No. PCT/KR2023/003916, filed on Mar. 24, 2023, which is based on and claims the benefit of a Chinese patent application number 202210398578.1, filed on Apr. 15, 2022, in the Chinese Intellectual Property Office, the disclosure of which is incorporated by reference herein in its entirety.

BACKGROUND

1. Field

The disclosure relates to the technical field of communications. More particularly, the disclosure relates to a mixed-mode dielectric waveguide filter.

2. Description of Related Art

Dielectric waveguide filters have long been the first choice for mobile communication base station filters due to the advantages of good electromagnetic shielding, compact structure, low passband insertion loss, small size, and high power capacity.

The application of single-layer dielectric filters is limited due to low Q value and large insertion loss thereof. However, in a conventional double-layer structure, two layers of structure need to be welded, and a middle coupling structure is not adjustable due to the structure fixing. Therefore, the productivity is poor. Although a dual-mode dielectric filter achieves the improvement of Q value, adjacent dual-mode dielectric cavities need to be welded through a coupling plate and other structures, which results in an unadjustable coupling structure, large parameter correlation, and difficult debugging.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a mixed-mode dielectric waveguide filter.

Additional aspects will be set forth in part in the description which follows and, in part, will be apparent from the description, or may be learned by practice of the presented embodiments.

In accordance with an aspect of the disclosure, a mixed-mode dielectric waveguide filter is provided. The mixed-mode dielectric waveguide filter includes a single-mode cavity filter and a multi-mode cavity filter, and can realize an asymmetric zero point by means of a parallel topology, so as to improve the Q value of the single-mode cavity filter and reduce the insertion loss.

In accordance with another aspect of the disclosure, a mixed-mode dielectric waveguide filter is provided. The mixed-mode dielectric waveguide filter includes a first multi-mode resonant cavity having at least two resonant modes, and a pair of first single-mode resonant cavities, wherein the pair of first single-mode resonant cavities correspond to the first multi-mode resonant cavity and are directly coupled to a respective resonant mode of the first multi-mode resonant cavity to form a series topology with the first multi-mode resonant cavity, and wherein a parallel topology is formed between resonant modes of the first multi-mode resonant cavity.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
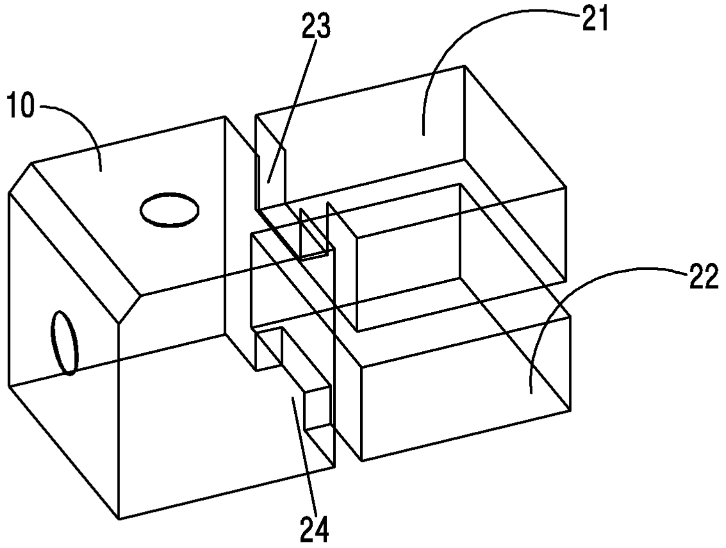
FIG. 1 is a schematic structural diagram of a first embodiment of a mixed-mode dielectric waveguide filter according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to "a component surface" includes reference to one or more of such surfaces.

Various embodiments of the disclosure provide a filtering device and a coupling structure for a cavity filter. The resonant frequency of the coupling structure is improved to increase a distance between the resonant frequency of the coupling structure and a passband while satisfying a coupling amount.

Various embodiments of the disclosure provide a mixed-mode dielectric waveguide filter, including:

a first multi-mode resonant cavity having at least two resonant modes; and a pair of first single-mode resonant cavities, the pair of first single-mode resonant cavities corresponding to the first multi-mode resonant cavity and being directly coupled to a respective resonant mode of the first multi-mode resonant cavity to form a series topology with the first multi-mode resonant cavity, and a parallel topology is formed between the resonant modes of the first multi-mode resonant cavity.

In one embodiment, the pair of first single-mode resonant cavities are stacked to form a double-layer dielectric waveguide filter.

In one embodiment, the pair of first single-mode resonant cavities include an upper first single-mode resonant cavity and a lower first single-mode resonant cavity, the upper first single-mode resonant cavity is coupled to the first multi-mode resonant cavity via an upper first coupling window, and the lower first single-mode resonant cavity is coupled to the first multi-mode resonant cavity via a lower first coupling window, and the upper first coupling window and the lower first coupling window are provided in a same surface of the first multi-mode resonant cavity.

In one embodiment, the upper first coupling window is connected to a top surface of the first multi-mode resonant cavity, and the lower first coupling window is connected to a bottom surface of the first multi-mode resonant cavity.

In one embodiment, the first multi-mode resonant cavity has two resonant modes, the upper first single-mode resonant cavity and the two resonant modes of the first multi-mode resonant cavity form a first coupling and a second coupling, the lower first single-mode resonant cavity and the two resonant modes of the first multi-mode resonant cavity form a third coupling and a fourth coupling, the upper first single-mode resonant cavity and the lower first single-mode resonant cavity form a fifth coupling, and at least one of the first coupling, the second coupling, the third coupling, or the fourth coupling is a negative coupling.

In one embodiment, the upper first single-mode resonant cavity and the lower first single-mode resonant cavity respectively form different coupling modes with the first multi-mode resonant cavity.

In one embodiment, the mixed-mode dielectric waveguide filter further includes:

a second multi-mode resonant cavity having at least two resonant modes; and a pair of second single-mode resonant cavities corresponding to the second multi-mode resonant cavity, the pair of second single-mode resonant cavities being directly coupled to a respective resonant mode of the second multi-mode resonant cavity to form a series topology with the second multi-mode resonant cavity, a parallel topology being formed between the resonant modes of the second multi-mode resonant cavity, and the first multi-mode resonant cavity and the second multi-mode resonant cavity are not directly coupled, and one of the first single-mode resonant cavities and one of the second single-mode resonant cavities are directly coupled.

In one embodiment, the second single-mode resonant cavities include an upper second single-mode resonant cavity and a lower second single-mode resonant cavity, the upper second single-mode resonant cavity is coupled to the second multi-mode resonant cavity via an upper second coupling window, and the lower second single-mode resonant cavity is coupled to the second multi-mode resonant cavity via a lower second coupling window, the upper second coupling window and the lower second coupling window are provided in a same surface of the second multi-mode resonant cavity, and the upper first single-mode resonant cavity and the upper second single-mode resonant cavity are directly coupled via an upper third coupling window.

In one embodiment, the upper first single-mode resonant cavity and the lower first single-mode resonant cavity are directly coupled, and the upper second single-mode resonant cavity and the lower second single-mode resonant cavity are directly coupled.

In one embodiment, the lower first single-mode resonant cavity and the lower second single-mode resonant cavity are connected to a first feed end and a second feed end, respectively.

In the embodiment, by introducing a multi-mode resonant cavity into a single-mode dielectric waveguide filter, a zero-point cavity is converted into a multi-mode cavity. The Q value of the filter is increased and the insertion loss is reduced compared with a filter containing only a single-mode resonant cavity. Moreover, by adjusting a coupling topology relationship, both an asymmetric zero point and a same-side CQ zero point can be realized.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 2:
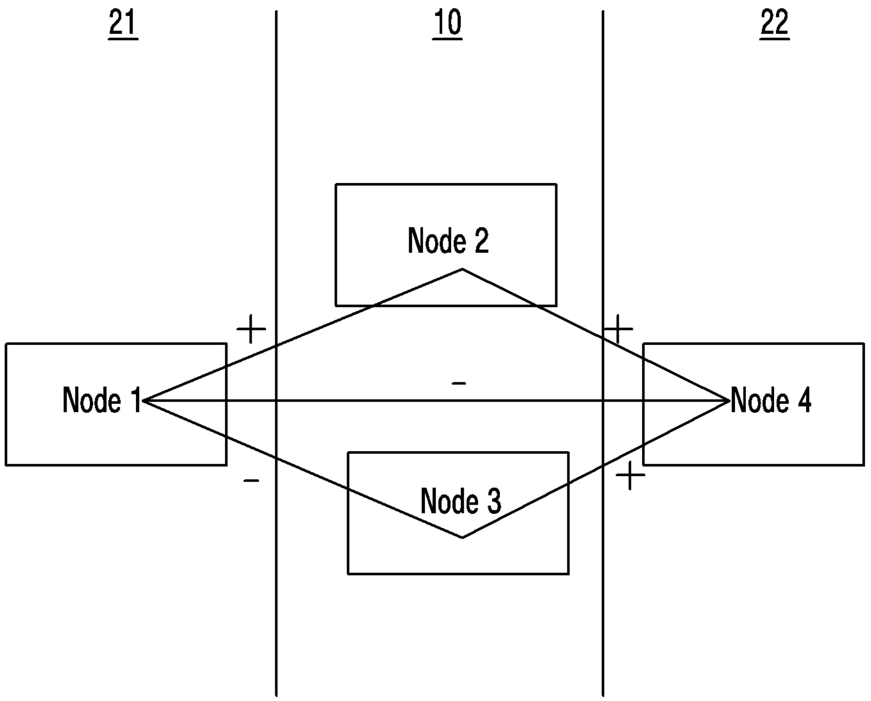
FIG. 2 is a topology diagram of the mixed-mode dielectric waveguide filter of FIG. 1 according to an embodiment of the disclosure.

FIG. 1 is a schematic structural diagram of a first embodiment of a mixed-mode dielectric waveguide filter according to an embodiment of the disclosure. FIG. 2 is a topology diagram of the mixed-mode dielectric waveguide filter of FIG. 1 according to an embodiment of the disclosure.

Referring to FIGS. 1 and 2, one embodiment of the disclosure provides a mixed-mode dielectric waveguide filter, including:

- a first multi-mode resonant cavity 10 having at least two resonant modes; and
- a pair of first single-mode resonant cavities 21, 22, the pair of first single-mode resonant cavities 21, 22 corresponding to the first multi-mode resonant cavity 10, the pair of first single-mode resonant cavities 21, 22 being directly coupled to each resonant mode of the first multi-mode resonant cavity 10, respectively, to form a series topology with the first multi-mode resonant cavity 10, a parallel topology being formed between a plurality of resonant modes of the first multi-mode resonant cavity 10.

In the dielectric waveguide filter of the embodiment, a first multi-mode resonant cavity 10 and first single-mode resonant cavities 21, 22 are provided. Each first multi-mode resonant cavity 10 corresponds to at least two first single-mode resonant cavities 21, 22. Each first single-mode resonant cavity is directly coupled to any one of resonant modes of the first multi-mode resonant cavity 10, so as to form a series topology, while a plurality of resonant modes of the first multi-mode resonant cavity 10 are in the form of a parallel topology. Then, the pair of first single-mode resonant cavities 21, 22 may be formed in the form of a double-layer single-mode dielectric filter. Therefore, in a preferred embodiment, the pair of first single-mode resonant cavities 21, 22 is stacked to form a double-layer dielectric waveguide filter.

In the embodiment, the first multi-mode resonant cavity 10 may be implemented as a dual-mode filter, which may have at least two resonant modes. For example, the first multi-mode resonant cavity 10 may have a TE10 mode and a TE11 mode, etc. Optionally, the two resonant modes may be two modes in which electric field directions are perpendicular to each other, e.g. two modes in which the electric field directions are direction Z and direction Y. Correspondingly, the electric field directions of the resonant modes of the pair of first single-mode resonant cavities 21, 22 corresponding to the first multi-mode resonant cavity 10 are consistent with the electric field direction of one of the resonant modes of the first multi-mode resonant cavity 10, e.g. a mode in direction Z.

In conjunction with FIG. 2, it can be seen that the dielectric waveguide filter shown in FIG. 1 includes three cavity filters: first single-mode resonant cavities 21, 22 and a first multi-mode resonant cavity 10. The first single-mode resonant cavities 21 and 22 both have one mode, and respectively correspond to one topological node: node 1 and node 4. The first multi-mode resonant cavity 10 has two modes, and corresponds to two topological nodes: node 2 and node 3. With a coupling connection manner as shown in FIG. 1, five coupling connection relationships are formed between the four nodes: a first coupling and a second coupling formed by the first single-mode resonant cavity 21 and the two resonant modes of the first multi-mode resonant cavity 10, a third coupling and a fourth coupling formed by a first single-mode resonant cavity (e.g., lower first single-mode resonant cavity 22) and the two resonant modes of the first multi-mode resonant cavity 10, and a fifth coupling formed by the first single-mode resonant cavities 21, 22. The first coupling, the second coupling, the third coupling, and the fourth coupling are all series couplings, and the fifth coupling is a parallel coupling. At least one of the first coupling, the second coupling, the third coupling, and the fourth coupling forms a negative coupling, so that a transmission zero point may be generated at a low end of a passband, while the four series couplings necessarily have at least one positive coupling, so that a transmission zero point may also be generated at a high end of the passband.

It can be seen therefrom that in the embodiment, by introducing a multi-mode resonant cavity into a single-mode dielectric waveguide filter, a zero-point cavity is converted into a multi-mode cavity. The Q value of the filter is increased and the insertion loss is reduced compared with a filter containing only a single-mode resonant cavity. Moreover, by adjusting a coupling topology relationship, both an asymmetric zero point and a same-side CQ zero point can be realized.

Referring to FIG. 2, in order to achieve at least one negative coupling, an upper first single-mode resonant cavity 21 and a lower first single-mode resonant cavity 22 form different coupling modes with the first multi-mode resonant cavity 10, respectively. For example, the upper first single-mode resonant cavity 21 and the two modes of the first multi-mode resonant cavity 10 may form one negative coupling and one positive coupling, while the lower first single-mode resonant cavity 22 and the two modes of the first multi-mode resonant cavity 10 may form two positive couplings.

The first single-mode resonant cavities 21, 22 may be provided in a stacked manner, e.g. stacked in a vertical direction. The first single-mode resonant cavities 21, 22 include an upper first single-mode resonant cavity 21 and a lower first single-mode resonant cavity 22.

The upper first single-mode resonant cavity 21 is coupled to the first multi-mode resonant cavity 10 via an upper first coupling window 23, and the lower first single-mode resonant cavity 22 is coupled to the first multi-mode resonant cavity 10 via a lower first coupling window 24. In a preferred embodiment, the upper first coupling window 23 and the lower first coupling window 24 are provided in the same surface of the first multi-mode resonant cavity 10.

It can be seen from FIG. 1 that instead of forming a stacked double-layer filter by welding, the upper first single-mode resonant cavity 21 and the lower first single-mode resonant cavity 22 form a stacked structure by means of the first multi-mode resonant cavity 10, and there may be a gap between the upper first single-mode resonant cavity 21 and the lower first single-mode resonant cavity 22. The height of the first multi-mode resonant cavity 10 may correspond to the sum of the heights of the upper first single-mode resonant cavity 21 and the lower first single-mode resonant cavity 22, and the upper first single-mode resonant cavity 21 and the lower first single-mode resonant cavity 22 are located on the same side of the first multi-mode resonant cavity 10. In this way, although the first multi-mode resonant cavity 10 is connected in series with the upper first single-mode resonant cavity 21 and the lower first single-mode resonant cavity 22 respectively and the first multi-mode resonant cavity 10 is connected in series between the upper first single-mode resonant cavity 21 and the lower first single-mode resonant cavity 22, a linear connection is not formed. The space occupied by the dielectric waveguide filter of the embodiment can be greatly reduced, and it is possible to realize the parallel topology of the upper first single-mode resonant cavity 21 and the lower first single-mode resonant cavity 22.

Figure 3:
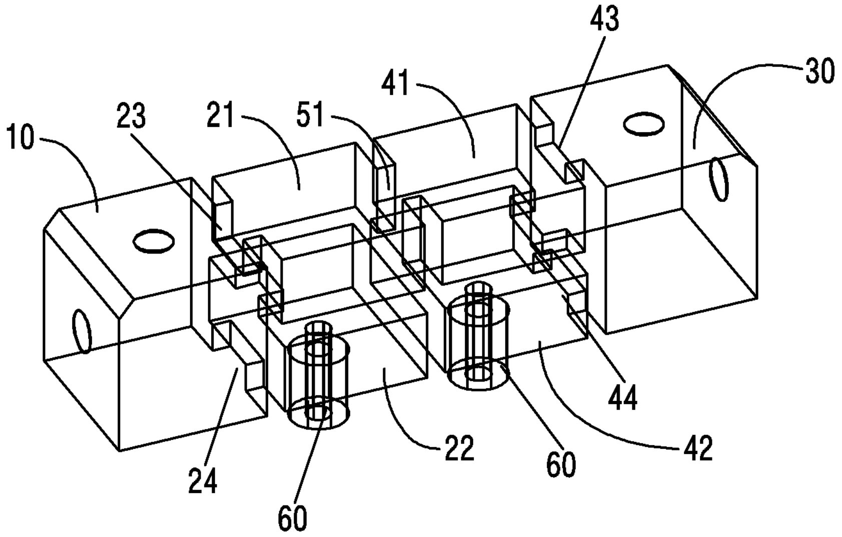
FIG. 3 is a schematic structural diagram of a second embodiment of a mixed-mode dielectric waveguide filter according to an embodiment of the disclosure.

The coupling connection between the upper first single-mode resonant cavity 21 and the lower first single-mode resonant cavity 22 is not shown in FIG. 1 but can be seen in FIG. 3.

Compared with a single-layer structure, the Q value of the mixed-mode dielectric waveguide filter of the embodiment is increased by 60%, and is 35% higher than that of a single-mode dielectric filter of a double-layer structure. The insertion loss of the filter can be greatly reduced.

Further, referring to FIG. 1, the upper first coupling window 23 is connected to a top surface of the first multi-mode resonant cavity 10, and the lower first coupling window 24 is connected to a bottom surface of the first multi-mode resonant cavity 10.

Although the coupling window is provided on a side wall of the first single-mode resonant cavity, the height thereof is often not distributed over the side wall thereof. In the embodiment, the upper first single-mode resonant cavity 21 is coupled to the first multi-mode resonant cavity 10 via the upper first coupling window 23, and the provision positions of the upper first coupling window 23 on the side walls of the first multi-mode resonant cavity 10 and the upper first single-mode resonant cavity 21 correspond to the top surfaces thereof, i.e., a user may finely adjust the structure of the upper first coupling window 23 from the top surface of the dielectric waveguide filter shown in FIG. 1, thereby adjusting a coupling amount between the upper first single-mode resonant cavity 21 and the first multi-mode resonant cavity 10.

Similarly, the provision positions of the lower first coupling window 24 on the side walls of the first multi-mode resonant cavity 10 and the lower first single-mode resonant cavity 22 correspond to the bottom surfaces thereof, i.e., a user may finely adjust the structure of the lower first coupling window 24 from the bottom surface of the dielectric waveguide filter shown in FIG. 1, thereby adjusting a coupling amount between the lower first single-mode resonant cavity 22 and the first multi-mode resonant cavity 10.

Unlike the conventional double-layer filters and multi-mode filters, a coupling structure between the cavities of the embodiment may be provided on the overall external surface of the dielectric waveguide filter, so that the coupling structure can be conveniently adjusted.

Figure 4:
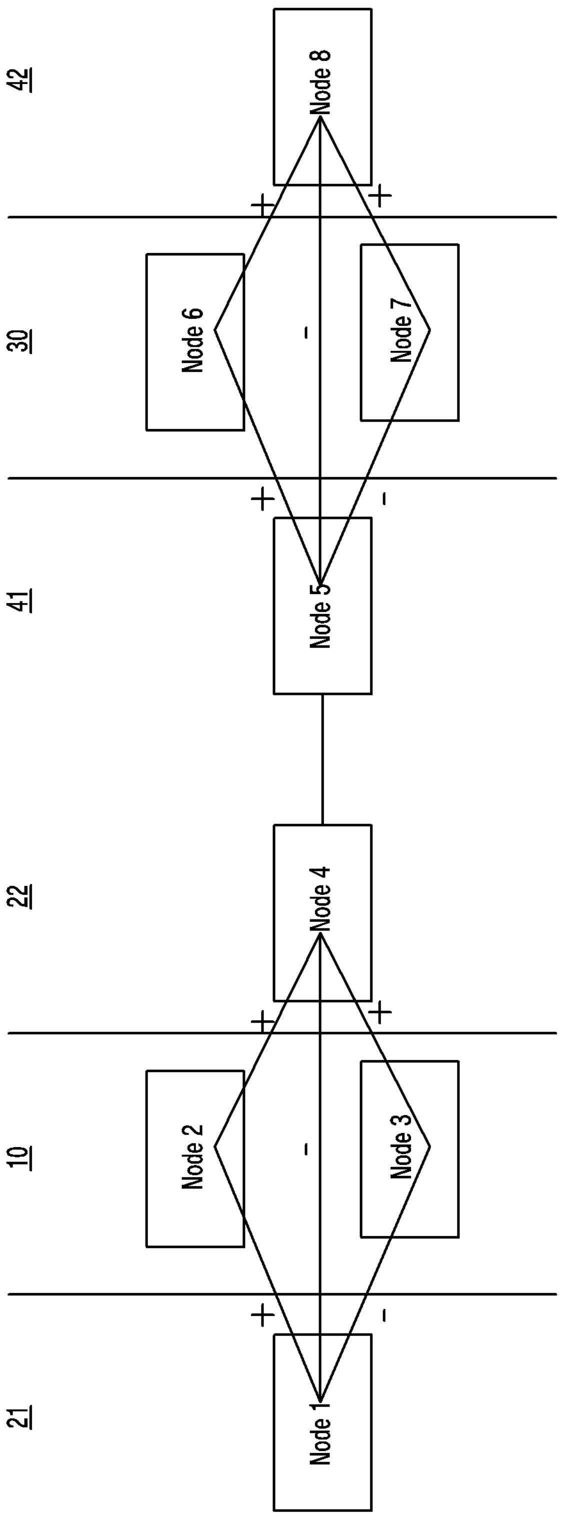
FIG. 4 is a topology diagram of the mixed-mode dielectric waveguide filter of FIG. 3 according to an embodiment of the disclosure.

FIG. 3 is a schematic structural diagram of a second embodiment of a mixed-mode dielectric waveguide filter according to an embodiment of the disclosure. FIG. 4 is a topology diagram of the mixed-mode dielectric waveguide filter of FIG. 3 according to an embodiment of the disclosure.

Referring to FIGS. 3 and 4, the dielectric waveguide filter of the embodiment includes:

- a first multi-mode resonant cavity 10 and a pair of first single-mode resonant cavities 21, 22 corresponding to the first multi-mode resonant cavity 10; and
- a second multi-mode resonant cavity 30 and a pair of second single-mode resonant cavities 41, 42 corresponding to the second multi-mode resonant cavity.

Each of the second single-mode resonant cavities 41, 42 is directly coupled to each resonant mode of the second multi-mode resonant cavity 30, respectively, to form a series topology with the second multi-mode resonant cavity 30, and a parallel topology is formed between a plurality of resonant modes of the second multi-mode resonant cavity 30.

The first multi-mode resonant cavity 10 and the pair of first single-mode resonant cavities 21, 22 may be connected as in the embodiment shown in FIG. 1. Similarly, the second multi-mode resonant cavity 30 and the pair of second single-mode resonant cavities 41, 42 may also be connected as in FIG. 1.

Further, the first multi-mode resonant cavity 10 and the second multi-mode resonant cavity 30 are not directly coupled, and one of the first single-mode resonant cavities (e.g., upper first single-mode resonant cavity 21) and one of the second single-mode resonant cavities (e.g., upper second single-mode resonant cavity 41) are directly coupled, so as to realize a series connection of dielectric waveguide filters.

In a physical structure of the embodiment, the first multi-mode resonant cavity 10 and the second multi-mode resonant cavity 30 may be located at both ends, while the corresponding pair of first single-mode resonant cavities 21, 22 and the pair of second single-mode resonant cavities 41, 42 are located between the first multi-mode resonant cavity 10 and the second multi-mode resonant cavity 30.

It can be seen from FIG. 2 that the dielectric waveguide filter of the embodiment is characterized by compact structure, and there is no coupling between two resonant modes of two multi-mode resonant cavities in the embodiment, so that the multi-mode resonant cavities do not need to be chamfered, thereby reducing the relevance of debugging.

The second single-mode resonant cavities 41, 42 include an upper second single-mode resonant cavity 41 and a lower second single-mode resonant cavity 42.

The upper second single-mode resonant cavity 41 is coupled to the second multi-mode resonant cavity 30 via an upper second coupling window 43, and the lower second single-mode resonant cavity 42 is coupled to the second multi-mode resonant cavity 30 via a lower second coupling window 44.

The upper second coupling window 43 and the lower second coupling window 44 are provided in the same surface of the second multi-mode resonant cavity 30.

The upper first single-mode resonant cavity 21 and the upper second single-mode resonant cavity 41 are directly coupled via an upper third coupling window 51.

The upper third coupling window 51, the upper second coupling window 43 and the upper first coupling window 23 may be located on a pair of opposite surfaces of the upper second single-mode resonant cavity 41 and the upper first single-mode resonant cavity 21, respectively.

Referring to FIG. 3, the upper second coupling window 43 is connected to a top surface of the second multi-mode resonant cavity 30, and the lower second coupling window 44 is connected to a bottom surface of the second multi-mode resonant cavity 30.

Although the coupling window is provided on a side wall of the second single-mode resonant cavity, the height thereof is often not distributed over the side wall thereof. In the embodiment, the upper second single-mode resonant cavity 41 is coupled to the second multi-mode resonant cavity 30 via the upper second coupling window 43, and the provision positions of the upper second coupling window 43 on the side walls of the second multi-mode resonant cavity 30 and the upper second single-mode resonant cavity 41 correspond to the top surfaces thereof, i.e., a user may finely adjust the structure of the upper second coupling window 43 from the top surface of the dielectric waveguide filter shown in FIG. 3, thereby adjusting a coupling amount between the upper second single-mode resonant cavity 41 and the second multi-mode resonant cavity 30.

Similarly, the provision positions of the lower second coupling window 44 on the side walls of the second multi-mode resonant cavity 30 and the lower second single-mode resonant cavity 42 correspond to the bottom surfaces thereof, i.e., a user may finely adjust the structure of the lower second coupling window 44 from the bottom surface of the dielectric waveguide filter shown in FIG. 3, thereby adjusting a coupling amount between the lower second single-mode resonant cavity 42 and the second multi-mode resonant cavity 30.

Further, referring to FIG. 3, the upper first single-mode resonant cavity 21 and the lower first single-mode resonant cavity 22 are directly coupled; and the upper second single-mode resonant cavity 41 and the lower second single-mode resonant cavity 42 are directly coupled.

Referring to FIG. 4, the lower first single-mode resonant cavity 22 and the lower second single-mode resonant cavity 42 are connected to first and second feed ends 60, respectively.

In conjunction with FIG. 4, it can be seen that the dielectric waveguide filter shown in FIG. 3 includes six cavity filters: first single-mode resonant cavities 21, 22, a first multi-mode resonant cavity 10, second single-mode resonant cavities 41, 42, and a second multi-mode resonant cavity 30. The first single-mode resonant cavities 21, 22 and the second single-mode resonant cavities 41, 42 all have one mode, and respectively correspond to one topological node: node 1, node 4, node 5, and node 8. The first multi-mode resonant cavity 10 and the second multi-mode resonant cavity 30 have two modes, and respectively correspond to two topological nodes: node 2 and node 3, node 6 and node 7. With a coupling connection manner as shown in FIG. 3, 10 coupling connection relationships are formed between the eight nodes: a first coupling and a second coupling formed by a first single-mode resonant cavity (e.g., upper first single-mode resonant cavity 21) and the two resonant modes of the first multi-mode resonant cavity 10, a third coupling and a fourth coupling formed by the lower first single-mode resonant cavity 22 and the two resonant modes of the first multi-mode resonant cavity 10, a fifth coupling formed by the first single-mode resonant cavities 21, 22, a sixth coupling and a seventh coupling formed by the upper second single-mode resonant cavity 41 and the two resonant modes of the second multi-mode resonant cavity 30, an eighth coupling and a ninth coupling formed by the lower second single-mode resonant cavity 42 and the two resonant modes of the second multi-mode resonant cavity 30, and a tenth coupling formed by the second single-mode resonant cavities 41, 42. The first coupling, the second coupling, the third coupling, and the fourth coupling are all series couplings, and the fifth coupling is a parallel coupling. At least one of the first coupling, the second coupling, the third coupling, and the fourth coupling forms a negative coupling, so that a transmission zero point may be generated at a low end of a passband, while the four series couplings necessarily have at least one positive coupling, so that a transmission zero point may also be generated at a high end of the passband. At least one of the sixth coupling, the seventh coupling, the eighth coupling, and the ninth coupling forms a negative coupling, so that a transmission zero point may be generated at a low end of a passband, while the four series couplings necessarily have at least one positive coupling, so that a transmission zero point may also be generated at a high end of the passband.

The connection between node 4 and node 5 is a direct connection, and therefore transmission zero points formed in the first coupling, the second coupling, the third coupling, and the fourth coupling and transmission zero points formed in the sixth coupling, the seventh coupling, the eighth coupling, and the ninth coupling do not affect each other.

Figure 5:
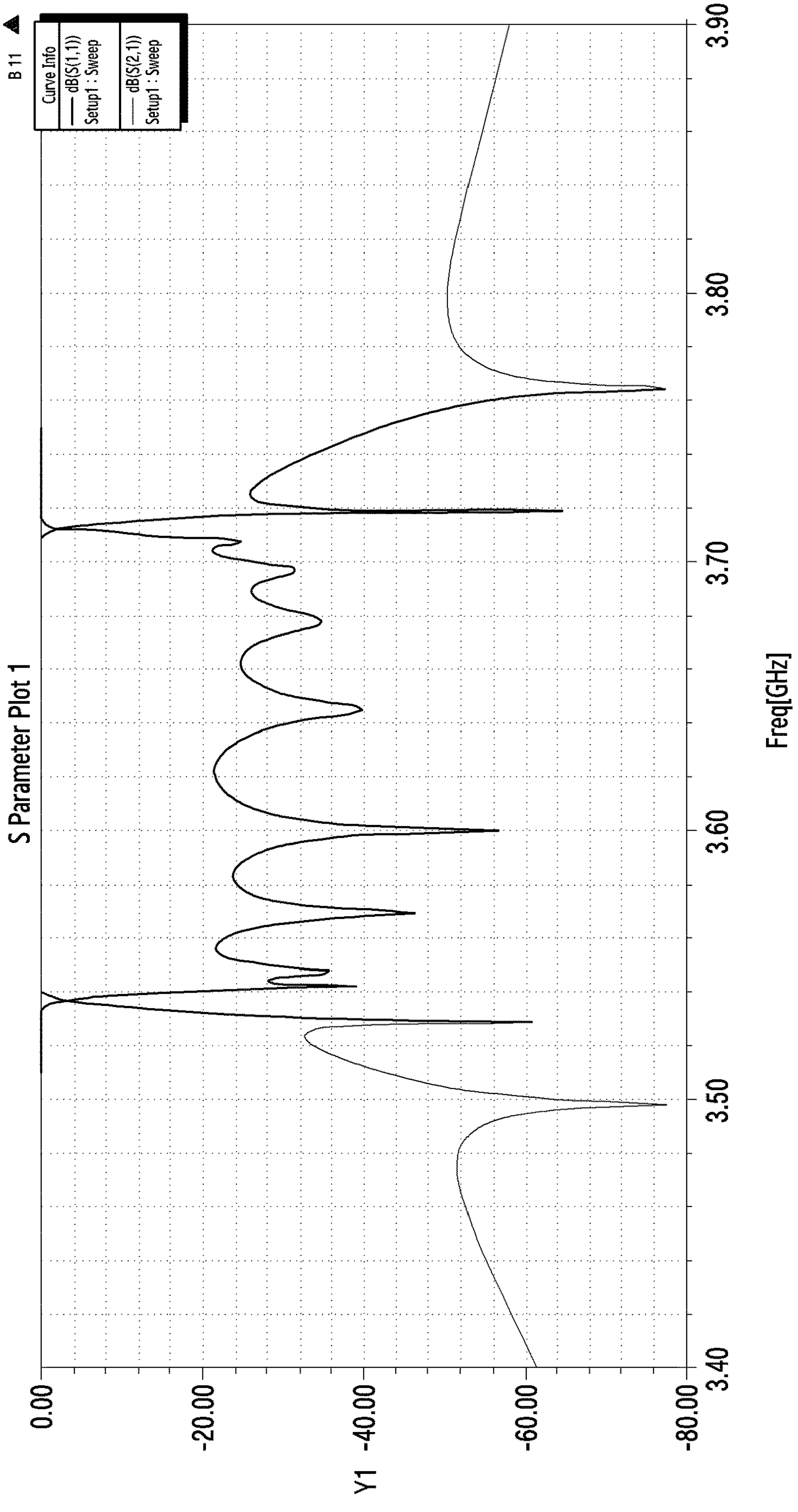
FIG. 5 is a waveform diagram of the mixed-mode dielectric waveguide filter of FIG. 3 according to an embodiment of the disclosure.

FIG. 5 is a waveform diagram of the mixed-mode dielectric waveguide filter of FIG. 3 according to an embodiment of the disclosure.

Referring to FIG. 5, it can be seen that in the embodiment shown in FIG. 3, a transmission zero point generated by the upper first single-mode resonant cavity 21 and the lower first single-mode resonant cavity 22, and a transmission zero point generated by the upper second single-mode resonant cavity 41 and the lower second single-mode resonant cavity 42 are generated at a lower end of a passband respectively. A transmission zero point generated by the upper first single-mode resonant cavity 21 and the lower first single-mode resonant cavity 22, and a transmission zero point generated by the upper second single-mode resonant cavity 41 and the lower second single-mode resonant cavity 42 are generated at a high end of the pass band, respectively.

It can be seen therefrom that in the embodiment, by introducing a multi-mode resonant cavity into a single-mode dielectric waveguide filter, a zero-point cavity is converted into a multi-mode cavity. The Q value of the filter is increased and the insertion loss is reduced compared with a filter containing only a single-mode resonant cavity. Moreover, by adjusting a coupling topology relationship, both an asymmetric zero point and a same-side CQ zero point can be realized.

According to various embodiments, there is provided a mixed-mode dielectric waveguide filter comprising: a first multi-mode resonant cavity 10 having at least two resonant modes; and a pair of first single-mode resonant cavities 21, 22, wherein the pair of first single-mode resonant cavities 21, 22 correspond to the first multi-mode resonant cavity 10 and are directly coupled to a respective resonant mode of the first multi-mode resonant cavity 10 to form a series topology with the first multi-mode resonant cavity 10, and wherein a parallel topology is formed between resonant modes of the first multi-mode resonant cavity 10.

In one embodiment, the pair of first single-mode resonant cavities 21, 22 are stacked to form a double-layer dielectric waveguide filter.

In one embodiment, the pair of first single-mode resonant cavities 21, 22 comprise an upper first single-mode resonant cavity 21 and a lower first single-mode resonant cavity 22, wherein the upper first single-mode resonant cavity 21 is coupled to the first multi-mode resonant cavity 10 via an upper first coupling window 23, and the lower first single-mode resonant cavity 22 is coupled to the first multi-mode resonant cavity 10 via a lower first coupling window 24, and wherein the upper first coupling window 23 and the lower first coupling window 24 are provided in a same surface of the first multi-mode resonant cavity 10.

In one embodiment, the upper first coupling window 23 is connected to a top surface of the first multi-mode resonant cavity 10, and the lower first coupling window 24 is connected to a bottom surface of the first multi-mode resonant cavity 10.

In one embodiment, the first multi-mode resonant cavity 10 has two resonant modes, the upper first single-mode resonant cavity 21 and the two resonant modes of the first multi-mode resonant cavity 10 forming a first coupling and a second coupling, the lower first single-mode resonant cavity 22 and the two resonant modes of the first multi-mode resonant cavity 10 forming a third coupling and a fourth coupling, the upper first single-mode resonant cavity 21 and the lower first single-mode resonant cavity 22 forming a fifth coupling, and at least one of the first coupling, the second coupling, the third coupling, or the fourth coupling is a negative coupling.

In one embodiment, the upper first single-mode resonant cavity 21 and the lower first single-mode resonant cavity 22 respectively form different coupling modes with the first multi-mode resonant cavity 10.

In one embodiment, the mixed-mode dielectric waveguide filter further comprises a second multi-mode resonant cavity 30 having at least two resonant modes, and a pair of second single-mode resonant cavities 41, 42 correspond to the second multi-mode resonant cavity 30, the pair of second single-mode resonant cavities 41, 42 being directly coupled to a respective resonant mode of the second multi-mode resonant cavity 30 to form a series topology with the second multi-mode resonant cavity 30, a parallel topology being formed between the resonant modes of the second multi-mode resonant cavity 30, the first multi-mode resonant cavity 10 and the second multi-mode resonant cavity 30 not being directly coupled, and one of the first single-mode resonant cavities (e.g., the upper first single-mode resonant cavity 21) and one of the second single-mode resonant cavities (e.g., upper second single-mode resonant cavity 41) are directly coupled.

In one embodiment, the second single-mode resonant cavities 41, 42 comprise an upper second single-mode resonant cavity 41 and a lower second single-mode resonant cavity 42, the upper second single-mode resonant cavity 41 being coupled to the second multi-mode resonant cavity 30 via an upper second coupling window 43, and the lower second single-mode resonant cavity 42 being coupled to the second multi-mode resonant cavity 30 via a lower second coupling window 44, the upper second coupling window 43 and the lower second coupling window 44 being provided in a same surface of the second multi-mode resonant cavity 30, and an upper first single-mode resonant cavity 21 and the upper second single-mode resonant cavity 41 being directly coupled via an upper third coupling window 51.

In one embodiment, the upper first single-mode resonant cavity 21 and the lower first single-mode resonant cavity 22 are directly coupled, and the upper second single-mode resonant cavity 41 and the lower second single-mode resonant cavity 42 are directly coupled.

In one embodiment, the lower first single-mode resonant cavity 22 and the lower second single-mode resonant cavity 42 are connected to first and second feed ends 60, respectively.

While the basic principles of the disclosure have been described above in connection with specific embodiments, it is to be noted that the merits, advantages, effects, etc. mentioned in the disclosure are merely exemplary and not limiting, and are not to be construed as necessarily possessed by the various embodiments of the disclosure. In addition, specific details disclosed above are for purposes of illustration and understanding merely and are not intended to be limiting, and the above details do not limit the disclosure to be implemented by using the above specific details.

The block diagrams of devices, apparatuses, equipment, and systems referred to in the disclosure are merely illustrative examples and are not intended to require or imply that the connections, arrangements and configurations must be made in the manner shown in the block diagrams. These devices, apparatuses, equipment, and systems may be connected, arranged and configured in any manner, as will be appreciated by those skilled in the art. The words such as "including", "comprising", "having", and the like are open-ended words that mean "including, but not limited to", and are used interchangeably. The words "or" and "and" as used herein refer to the word "and/or" and may be used interchangeably therewith unless the context clearly indicates otherwise. The word "such as" as used herein refers to the phrase "such as, but not limited to" and may be used interchangeably therewith.

It should also be noted that in the apparatus, equipment and methods of the disclosure, the components or steps may be decomposed and/or recombined. Such decompositions and/or recombinations should be considered as equivalents to the disclosure.

The previous description of the disclosed aspects is provided to enable any person skilled in the art to make or use the disclosure. Various modifications to these aspects will be readily apparent to those skilled in the art, and the general principles defined herein may be applied to other aspects without departing from the scope of the disclosure. Therefore, the disclosure is not intended to be limited to the aspects shown herein but is to be accorded the broadest scope consistent with the principles and novel features disclosed herein.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A mixed-mode dielectric waveguide filter comprising:

a first multi-mode resonant cavity having at least two resonant modes; and a pair of first single-mode resonant cavities, wherein the pair of first single-mode resonant cavities correspond to the first multi-mode resonant cavity and are directly coupled to a respective resonant mode of the first multi-mode resonant cavity to form a series topology with the first multi-mode resonant cavity, and wherein a parallel topology is formed between resonant modes of the first multi-mode resonant cavity.

2. The mixed-mode dielectric waveguide filter of claim 1, wherein the pair of first single-mode resonant cavities are stacked to form a double-layer dielectric waveguide filter.

3. The mixed-mode dielectric waveguide filter of claim 2, wherein the pair of first single-mode resonant cavities comprise an upper first single-mode resonant cavity and a lower first single-mode resonant cavity, wherein the upper first single-mode resonant cavity is coupled to the first multi-mode resonant cavity via an upper first coupling window, and the lower first single-mode resonant cavity is coupled to the first multi-mode resonant cavity via a lower first coupling window, and wherein the upper first coupling window and the lower first coupling window are provided in a same surface of the first multi-mode resonant cavity.

4. The mixed-mode dielectric waveguide filter of claim 3, wherein the upper first coupling window is connected to a top surface of the first multi-mode resonant cavity, and wherein the lower first coupling window is connected to a bottom surface of the first multi-mode resonant cavity.

5. The mixed-mode dielectric waveguide filter of claim 3, wherein the first multi-mode resonant cavity has two resonant modes, wherein the upper first single-mode resonant cavity and the two resonant modes of the first multi-mode resonant cavity form a first coupling and a second coupling, wherein the lower first single-mode resonant cavity and the two resonant modes of the first multi-mode resonant cavity form a third coupling and a fourth coupling, wherein the upper first single-mode resonant cavity and the lower first single-mode resonant cavity form a fifth coupling, and wherein at least one of the first coupling, the second coupling, the third coupling, or the fourth coupling is a negative coupling.

6. The mixed-mode dielectric waveguide filter of claim 3, wherein the upper first single-mode resonant cavity and the lower first single-mode resonant cavity respectively form different coupling modes with the first multi-mode resonant cavity.

7. The mixed-mode dielectric waveguide filter of claim 3, further comprising:

a second multi-mode resonant cavity having at least two resonant modes, wherein a pair of second single-mode resonant cavities correspond to the second multi-mode resonant cavity, wherein the pair of second single-mode resonant cavities are directly coupled to a respective resonant mode of the second multi-mode resonant cavity to form a series topology with the second multi-mode resonant cavity, wherein a parallel topology is formed between resonant modes of the second multi-mode resonant cavity, wherein the first multi-mode resonant cavity and the second multi-mode resonant cavity are not directly coupled, and wherein one of the first single-mode resonant cavities and one of the second single-mode resonant cavities are directly coupled.

8. The mixed-mode dielectric waveguide filter of claim 7, wherein the second single-mode resonant cavities comprise an upper second single-mode resonant cavity and a lower second single-mode resonant cavity, wherein the upper second single-mode resonant cavity is coupled to the second multi-mode resonant cavity via an upper second coupling window, and the lower second single-mode resonant cavity is coupled to the second multi-mode resonant cavity via a lower second coupling window, wherein the upper second coupling window and the lower second coupling window are provided in a same surface of the second multi-mode resonant cavity, and wherein an upper first single-mode resonant cavity and the upper second single-mode resonant cavity are directly coupled via an upper third coupling window.

9. The mixed-mode dielectric waveguide filter of claim 8, wherein the upper first single-mode resonant cavity and the lower first single-mode resonant cavity are directly coupled, and wherein the upper second single-mode resonant cavity and the lower second single-mode resonant cavity are directly coupled.

10. The mixed-mode dielectric waveguide filter of claim 8, wherein the lower first single-mode resonant cavity and the lower second single-mode resonant cavity are connected to a first feed end and a second feed end, respectively.

* * * * *